(12) United States Patent
Kim et al.

(10) Patent No.: US 7,851,532 B2
(45) Date of Patent: Dec. 14, 2010

(54) FLAME RETARDANT THERMOPLASTIC POLYESTER RESIN COMPOSITION

(75) Inventors: Pil Ho Kim, Daejeongwangyeok-si (KR); Jong Cheol Lim, Anyang-si (KR); In Sik Shim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/476,273

(22) Filed: Jun. 2, 2009

(65) Prior Publication Data

US 2009/0239986 A1   Sep. 24, 2009

(30) Foreign Application Priority Data

Dec. 29, 2006   (KR) .................. 10-2006-0137435

(51) Int. Cl.
 C08K 3/00 (2006.01)
 C08K 3/10 (2006.01)
 C08K 3/18 (2006.01)
 C08K 3/22 (2006.01)
 C08K 3/26 (2006.01)
 C08K 3/30 (2006.01)
 C08K 3/38 (2006.01)

(52) U.S. Cl. .................. 524/401; 524/405; 524/413; 524/420; 524/423; 524/424; 524/427; 524/432; 524/436; 524/437

(58) Field of Classification Search .................. 524/401, 524/405, 413, 420, 423, 424, 427, 432, 436, 524/437
See application file for complete search history.

(56) References Cited

U.S. PATENT DOCUMENTS

| | | | | |
|---|---|---|---|---|
| 6,414,107 | B1 * | 7/2002 | Zobel et al. .................. | 528/196 |
| 6,469,095 | B1 | 10/2002 | Gareiss et al. | |
| 6,569,928 | B1 | 5/2003 | Levchik et al. | |
| 7,019,056 | B2 * | 3/2006 | Seidel et al. .................. | 524/127 |

FOREIGN PATENT DOCUMENTS

| | | |
|---|---|---|
| JP | 10-195283 | 7/1998 |
| JP | 2001-342357 A | 12/2001 |
| JP | 2003-226818 A | 8/2003 |
| JP | 2003-226819 A | 8/2003 |
| WO | 2008/082135 A1 | 7/2008 |

OTHER PUBLICATIONS

International Search Report in counterpart International Application No. PCT/KR2007/006814, mailed Apr. 17, 2008.

* cited by examiner

*Primary Examiner*—Kriellion A Sanders
(74) *Attorney, Agent, or Firm*—Summa, Additon & Ashe, P.A.

(57) ABSTRACT

Disclosed herein is a flame retardant thermoplastic polyester resin composition comprising: (A) about 100 parts by weight of a polyester resin; (B) about 1 to about 60 parts by weight of a cyclic oligomeric phosphazene compound; (C) about 1 to about 50 parts by weight of a melamine compound; (D) about 1 to about 20 parts by weight of a inorganic metal compound; and (E) about 0.1 to about 5 parts by weight of a fluorinated polyolefin resin. The thermoplastic polyester resin composition may further contain a filler (F).

9 Claims, No Drawings

FLAME RETARDANT THERMOPLASTIC POLYESTER RESIN COMPOSITION

CROSS-REFERENCE TO RELATED APPLICATIONS

This non-provisional application is a continuation-in-part application of PCT Application No. PCT/KR2007/006814, filed Dec. 26, 2007, pending, which designates the U.S. and which is hereby incorporated by reference in its entirety, and claims priority therefrom under 35 USC Section 120. This application also claims priority under 35 USC Section 119 from Korean Patent Application No. 10-2006-0137435, filed Dec. 29, 2006, the entire disclosure of which is also hereby incorporated by reference.

FIELD OF THE INVENTION

The present invention relates to a thermoplastic polyester resin composition having good flame retardancy.

BACKGROUND OF THE INVENTION

Thermoplastic polyester resins can have good chemical resistance, mechanical strength, and electrical insulatability, among other properties, and have accordingly been widely used in the production of electric/electronic parts, housings of automobile parts, connectors and the like.

In the field of electric and electronic devices, flame retardancy is especially required to ensure stability during a fire. A widely known method for imparting flame retardancy is the addition of a halogen-containing compound with an antimony oxide and metal oxide as a flame-retardant aid. However, such methods are disadvantageous because halogen gases released by thermal decomposition during molding processes can corrode the mold. Further, such toxic gases are undesirable in the workplace.

In particular, halogenated dioxin generated during a fire or combustion is harmful to humans and may cause environmental contamination. Accordingly, the use of halogen-containing flame retardant s has recently been restricted by law under TCO (The Swedish Confederation of Professional Employees). Thus, currently efforts are ongoing worldwide to develop technologies using halogen-free flame retardants as a substitute for halogen-containing flame retardants.

Japanese patent application laid-open No. 10-195283 discloses a polybutylene terephthalate resin composition using a phosphoric acid ester as a flame retardant. However, in this case, a large amount of flame retardant is needed to obtain sufficient flame retardancy. As a result, production costs may increase and the mechanical properties of the resin composition can be deteriorated.

U.S. Pat. No. 6,569,928 discloses a polyester resin composition comprising a melamine compound (melamine cyanurate) and phosphoric acid ester. However, this composition also requires a large amount of flame retardant to obtain flame retardancy, which results in deterioration of moldability and mechanical properties.

SUMMARY OF THE INVENTION

The present inventors have developed a thermoplastic polyester resin composition having good flame retardancy without deterioration of mechanical properties and which does not generate toxic halogen gas. The invention uses an oligomeric phosphazene compound, a melamine compound, an inorganic metal compound, a fluorinated polyolefin resin and a filler with a polyester base resin in a specific ratio.

Accordingly, one aspect of the invention provides a flame retardant thermoplastic polyester resin composition. The resin composition comprises (A) about 100 parts by weight of a polyester resin; (B) about 1 to about 60 parts by weight of a cyclic oligomeric phosphazene compound; (C) about 1 to about 50 parts by weight of a melamine compound; (D) about 1 to about 20 parts by weight of a inorganic metal compound; and (E) about 0.1 to about 5 parts by weight of a fluorinated polyolefin resin.

The thermoplastic polyester resin composition may further comprise a filler (F) in an amount of about 100 parts by weight or less. The filler (F) may comprise carbon fiber, glass fiber, glass beads, glass flake, carbon black, talc, clay, kaolin, mica, calcium carbonate, or a combination thereof.

The thermoplastic polyester resin composition may further comprise an additive selected from flame retardant aids, lubricants, release agents, nucleating agents, antistatic agents, stabilizers, reinforcing agents and combinations thereof.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polyester Resin

The polyester resin used as a base resin in the present invention may include thermoplastic polyester, copolyester, or a combination thereof. In exemplary embodiments of the invention, the polyester resin may include a polyalkylene terephthalate such as polyethylene terephthalate, polybutylene terephthalate, and polytrimethylene terephthalate, a polyalkylene naphthalate such as polyethylene naphthalate, polypropylene naphthalate, and polybutylene naphthalate, a dibenzoate such as polyethylene dibenzoate, and the like, and copolyesters and combinations thereof.

The polyethylene terephthalate can be a polycondensation polymer prepared by transesterification or esterification of terephthalic acid or dimethyl terephthalate with ethylene glycol.

The polybutylene terephthalate can be a polycondensation polymer prepared by transesterification or esterification of terephthalic acid or dimethyl terephthalate with 1,4-butandiol.

In exemplary embodiments of the invention, the polybutylene terephthalate can be modified by copolymerizing with one or more comonomers such as polytetramethylene glycol (PTMG), polyethylene glycol (PEG), polypropylene glycol (PPG), low-molecular-weight aliphatic polyester or aliphatic polyamide, and the like, and combinations thereof to improve the impact strength of the resin. In another embodiment, a modified polybutylene terephthalate prepared by blending an impact modifier can be used.

In exemplary embodiments of the invention, the polyester resin comprises polybutylene terephthalate having an intrinsic viscosity [η] of about 0.36 to about 1.6, for example about 0.52 to about 1.25, as measured in a solvent of o-chlorophenol at a temperature of 25° C. If the intrinsic viscosity [η] of the polybutylene terephthalate is in the range of about 0.36 to about 1.6, the resin composition may have an improved balance of physical properties such as mechanical properties and moldability.

(B) Cyclic Oligomeric Phosphazene Compound

The cyclic oligomeric phosphazene compound can be represented by Formula (I) in which cyclic phosphazenes are linked by a $R_2$ group. The cyclic oligomeric phosphazene compound may be used singly or in combination.

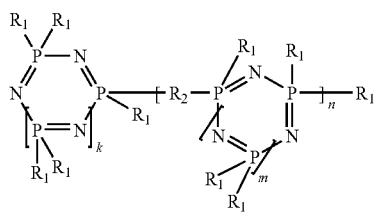

[Formula 1]

wherein each $R_1$ is independently $C_1$-$C_{20}$ alkyl, $C_6$-$C_{30}$ aryl, $C_6$-$C_{30}$ alkyl substituted aryl, $C_6$-$C_{30}$ arylakyl, $C_1$-$C_{20}$ alkoxy, $C_6$-$C_{30}$ aryloxy, amino, or hydroxyl, wherein the alkoxy or the aryloxy can optionally be substituted with $C_1$-$C_{20}$ alkyl, $C_6$-$C_{30}$ aryl, amino, or hydroxy group;

each k and m is independently 0 or integers from 1 to 10;

$R_2$ is $C_{6-30}$ dioxyaryl or alkyl substituted $C_{6-30}$ dioxyaryl derivative; and n is a number-average degree of polymerization and the average value of n is from about 0.3 to about 3.

In exemplary embodiments, the cyclic oligomeric phosphazene compound (B) can be used in an amount of about 1 to about 60 parts by weight, based on about 100 parts by weight of polyester resin (A). If the amount of the cyclic oligomeric phosphazene compound is less than 1 parts by weight, the resin composition may not have sufficient flame retardancy. If the amount of the cyclic oligomeric phosphazene compound is more than 60 parts by weight, the production cost may increase and the mechanical strength of the resin composition may be deteriorated. In exemplary embodiments of the invention, the cyclic oligomeric phosphazene compound may be used in an amount of about 10 to about 55 parts by weight, for example from about 20 to about 54 parts by weight, and as another example from about 25 to about 53 parts by weight.

(C) Melamine Compound

The melamine compound of the present invention may include a nitrogen-containing compound, a nitrogen-phosphorus-containing compound, or a combination thereof. Exemplary nitrogen-containing compounds may include without limitation melamine, melamine cyanurate, and the like, and combinations thereof. Exemplary nitrogen-phosphorus-containing compounds may include without limitation melamine phosphate, melamine pyrophosphate, melamine polyphosphate, and the like, and combinations thereof.

The melamine compound can be used in an amount of about 1 to about 50 parts by weight, for example about 5 to about 45 parts by weight, and as another example about 7 to about 40 parts by weight, based on about 100 parts by weight of the polyester resin (A). If the amount of the melamine compound is less than about 1 part by weight, the flame retardancy may be degraded. On the other hand, if the amount of the melamine compound is more than about 50 parts by weight, the mechanical properties may become lower.

(D) Inorganic Metal Compound

The inorganic metal compound is used to improve the flame retardancy. Exemplary inorganic metal compounds may include without limitation aluminum hydroxide, magnesium hydroxide, calcium hydroxide, zinc sulfide, zinc oxide, titanium oxide, magnesium calcium carbonate, magnesium carbonate, calcium carbonate, zinc borate, zinc borate hydrate, magnesium sulfate hydrate and the like, and combinations thereof. The inorganic metal compound(s) may be used singly or in combination.

The amount of the inorganic metal compound may be about 1 to about 20 parts by weight, for example about 5 to about 18.5 parts by weight, and as another example about 7 to about 17 parts by weight, based on about 100 parts by weight of the polyester resin (A). If the amount of the inorganic metal compound is less than about 1 part by weight, the flame retardancy may be degraded. On the other hand, if the amount of the inorganic metal compound is more than about 20 parts by weight, the mechanical properties may become lower.

(E) Fluorinated Polyolefin Resin

Exemplary fluorinated polyolefin resins may include, but are not limited to, polytetrafluoroethylene, polyvinylidenefluoride, tetrafluoroethylene/vinylidenefluoride copolymer, tetrafluoroethylene/hexafluoropropylene copolymer, and ethylene/tetrafluoroethylene copolymer and the like. These resins may be used singly or in combination.

The fluorinated polyolefin resin functions to form a fibrillar network in the resin composition when the resin composition is extruded, thereby decreasing melt viscosity of the resin composition and increasing shrinkage during combustion so as to prevent the dripping phenomena.

The fluorinated polyolefin resin can be prepared via polymerization techniques known in the art. According to exemplary embodiments, the fluorinated polyolefin resin can be prepared in an aqueous medium under a pressure of between about 7 and about 71 kg/cm$^2$ at a temperature of between about 0 and about 200° C., for example about 20 and about 100° C., in the presence of a free radical-forming catalyst such as sodium, potassium or ammonium peroxydisulfate, and the like.

According to exemplary embodiments, the fluorinated polyolefin resin can be used in an emulsive or powder state. When used as an emulsion, dispersion of the fluorinated polyolefin resin may be good, but the process will be somewhat complicated. Accordingly, the fluorinated polyolefin resin can be used as a powder state to uniformly disperse it in the entire resin composition to form the fibrillar network structure.

According to exemplary embodiments, the fluorinated polyolefin resin may be polytetrafluoroethylene having an average particle size ranging from about 0.05 and about 1,000 µm and a density ranging from about 1.2 and about 2.3 g/cm$^3$.

The fluorinated polyolefin resin can be used in an amount of about 0.1 to about 5 parts by weight, for example about 0.3 to about 4 parts by weight, and as another example about 0.4 to about 3 parts by weight, based on about 100 parts by weight of the polyester resin (A).

(F) Filler

In some embodiments, the composition may additionally comprise fillers of various particle sizes to increase mechanical properties, heat-resistance, dimensional stability and the like.

In exemplary embodiments, the filler can be a conventional inorganic or organic filler, or a combination thereof. Exemplary fillers may include, but are not limited to, carbon fiber, glass fiber, glass beads, glass flake, carbon black, talc, clay, kaolin, mica, calcium carbonate, and the like and combinations thereof. These fillers can be used alone or in combination with one another.

The filler can be used in an amount of about 100 parts by weight or less, for example about 5 to about 80 parts by weight, as another example about 10 to about 75 parts by weight, and as another example about 15 to about 70 parts by weight, based on about 100 parts by weight of the polyester resin (A).

The flame retardant thermoplastic polyester resin composition may additionally comprise conventional additives such as flame retardant aids, lubricants, release agents, nucleating agents, antistatic agents, stabilizers, reinforcing agents and the like. These additives can be used alone or in combination with one another.

The flame retardant thermoplastic polyester resin composition according to the present invention can be extruded in the form of pellets. In some embodiments, the resin composition can be molded into an electronic or electric sockets and connectors for use in a variety of products including TVs, computers, printers, washing machines, cassette players, audio systems and the like.

The flame retardant thermoplastic polyester resin composition according to the present invention can be widely used in many fields which require good flame retardancy and high mechanical properties.

The invention may be better understood by reference to the following examples which are intended for the purpose of illustration and are not to be construed as in any way limiting the scope of the present invention, which is defined in the claims appended hereto.

EXAMPLE (A) Polyester Resin

Polybutylene terephthalate having an intrinsic viscosity [$\eta$] of 1.0 as measured in a solvent of o-chlorophenol at a temperature of 25° C. is used.

(B) Cyclic Oligomeric Phosphazene Compound

Phosphazene (SPS-100) manufactured by Otsuka Chemical Co. of Japan is used.

(C) Melamine Compound

Melamine cyanurate (MC-120A) manufactured by Universal Chemtech Co. of Korea is used.

(D) Inorganic Metal Compound

Magnesium hydroxide (H-5) manufactured by Albemarle Co. is used.

(E) Fluorinated Polyolefin Resin

Teflon 800-J manufactured by Dupont Company is used.

(F) Filler

VETROTEX 952 glass fibers manufactured by Vetrotex are used.

(G) Phosphoric Acid Ester

RDP (PX-200) manufactured by Daihachi Co. of Japan is used.

Examples 1-5 and Comparative Examples 1-8

The components as shown in Table 1 are melted and kneaded through a twin-screw melt extruder at 240 to 280° C. to prepare a resin composition in a chip shape. The chips are dried at 130° C. for 5 hours or more, and molded into test specimens for measuring flame retardancy and mechanical properties using a screw type injection molding machine at 240 to 280° C.

TABLE 1

|  | Examples | | | | | Comparative Examples | | | | | | | |
| --- | --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 | 8 |
| (A) PBT | 100 | 100 | 100 | 100 | 100 | 100 | 100 | 100 | 100 | 100 | 100 | 100 | 100 |
| (B) Cyclic Oligomeric Phosphazene | 30 | 50 | 30 | 30 | 30 | — | 80 | 30 | 30 | 30 | 30 | — | 30 |
| (C) Melamine cyanurate | 10 | 10 | 25 | 10 | 10 | 10 | 10 | — | 60 | 10 | 10 | 10 | — |
| (D) Inorganic Metal Compound | 10 | 10 | 10 | 15 | 10 | 10 | 10 | 10 | 10 | — | 30 | 10 | 10 |
| (E) Fluorinated Polyolefin resin | 0.5 | 0.5 | 0.5 | 0.5 | 0.5 | 0.5 | 0.5 | 0.5 | 0.5 | 0.5 | 0.5 | 0.5 | 0.5 |
| (F) Filler | 60 | 60 | 60 | 60 | — | 60 | 60 | 60 | 60 | 60 | 60 | 60 | — |
| (G) Phosphoric Acid Ester | — | — | — | — | — | — | — | — | — | — | — | 30 | — |

The flame retardancy, impact strength, tensile strength, flexural strength and flexural modulus of the test specimens are measured as follows, and the results are shown in Table 2.

Property Test (1) Flame Retardancy: The flame retardancy is measured in accordance with UL94 vertical test at a thickness of ⅛ inch and 1/16 inch respectively.

(2) Impact Strength: The impact strength is measured in accordance with ASTM D256 at ⅛" thickness.

(3) Tensile Strength: The tensile strength is measured in accordance with ASTM D638 at ⅛" thickness.

(4) Flexural Strength: The flexural strength is measured in accordance with ASTM D790 at ¼" thickness.

(5) Flexural Modulus: The flexural modulus is measured in accordance with ASTM D790 at ¼" thickness.

TABLE 2

|  |  | Examples | | | | | Comparative examples | |
| --- | --- | --- | --- | --- | --- | --- | --- | --- |
|  |  | 1 | 2 | 3 | 4 | 5 | 1 | 2 |
| Flame | 1/8" | V-0 | V-0 | V-0 | V-0 | V-0 | fail | V-0 |
| retardancy | 1/16" | V-0 | V-0 | V-0 | V-0 | V-0 | fail | V-0 |
| Impact strength (kg·cm/cm) | | 5.6 | 5.0 | 6.3 | 5.1 | 3.3 | 6.0 | 5.0 |
| tensile strength (kg/cm²) | | 883 | 840 | 864 | 850 | 490 | 881 | 620 |
| flexural strength (kg/cm²) | | 1,210 | 1,130 | 1,200 | 1,160 | 630 | 1,200 | 650 |
| flexural modulus (kg/cm²) | | 73,230 | 72,150 | 80,100 | 73,200 | 20,600 | 82,200 | 65,100 |

|  |  | Comparative examples | | | | | |
| --- | --- | --- | --- | --- | --- | --- | --- |
|  |  | 3 | 4 | 5 | 6 | 7 | 8 |
| Flame | 1/8" | V-1 | V-0 | fail | V-0 | fail | Fail |
| retardancy | 1/16" | fail | V-0 | fail | fail | fail | fail |
| Impact strength (kg·cm/cm) | | 5.5 | 4.2 | 6.4 | 3.5 | 4.2 | 3.2 |
| tensile strength (kg/cm²) | | 840 | 680 | 880 | 650 | 650 | 480 |
| flexural strength (kg/cm²) | | 1,100 | 710 | 1,170 | 650 | 720 | 620 |
| flexural modulus (kg/cm²) | | 75,340 | 67,250 | 80,680 | 62,200 | 68,600 | 19,900 |

As shown in Table 2, Examples 1 to 5 according to the present invention show good mechanical properties as well as high flame retardancy. However, Comparative Example 1, which did not include the cyclic oligomeric phosphazene compound (B), Comparative Example 3, which did not include the melamine compound (C), and Comparative Example 5, which did not include the inorganic metal compound (D), exhibit poor flame retardancy. Comparative Examples 2 and 4, which include the cyclic oligomeric phosphazene compound (B) or the melamine compound (C) in an amount outside of the amount of the present invention, respectively, exhibit inferior mechanical properties. Comparative Example 6, which includes the inorganic metal compound (D) in an amount in excess of the range of the present invention, exhibits bad flame retardancy as well as inferior mechanical properties. Further, Comparative Example 7, which uses the phosphoric acid ester (G) instead of the oligomeric phosphazene compound (B), exhibits deterioration in flame retardancy and mechanical properties. Comparative Example 8, which does not include either melamine compound (C) or filler (F), also exhibits poor flame retardancy and low mechanical properties.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flame retardant thermoplastic polyester resin composition comprising:
   (A) about 100 parts by weight of a polyester resin, wherein said polyester resin (A) comprises polyethylene terephthalate, polybutylene terephthalate, polytrimethylene terephthalate, polyethylene naphthalate, polypropylene naphthalate, polybutylene naphthalate, polyethylene dibenzoate, a copolyester thereof, or a combination thereof;
   (B) about 1 to about 60 parts by weight of a cyclic oligomeric phosphazene compound, wherein said cyclic oligomeric phosphazene compound (B) is represented by the following Formula 1:

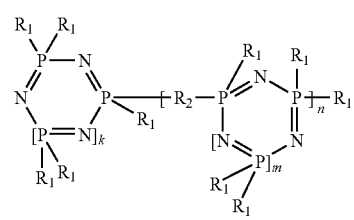

[Formula 1]

wherein $R_1$ is $C_1$-$C_{20}$ alkyl, $C_6$-$C_{30}$ aryl, $C_6$-$C_{30}$ alkyl substituted aryl, $C_6$-$C_{30}$ arylakyl, $C_1$-$C_{20}$ alkoxy, $C_6$-$C_{30}$ aryloxy, amino, or hydroxyl group, wherein the alkoxy or aryloxy can optionally be substituted with alkyl, aryl, amino, or hydroxyl,
   each k and m is independently 0 or integers from 1 to 10;
   $R_2$ is $C_{6-30}$ dioxyaryl or alkyl substituted $C_{6-30}$ dioxyaryl derivative; and
   n is a number-average degree of polymerization and the average value of n is from about 0.3 to about 3;
   (C) about 1 to about 50 parts by weight of a melamine compound;
   (D) about 1 to about 20 parts by weight of a inorganic metal compound; and
   (E) about 0.1 to about 5 parts by weight of a fluorinated polyolefin resin.

2. The flame retardant thermoplastic polyester resin composition of claim 1, further comprising (F) about 100 parts by weight or less of a filler.

3. The flame retardant thermoplastic polyester resin composition of claim 1, wherein said polyester resin (A) comprises polybutylene terephthalate having an intrinsic viscosity [η] of about 0.36 to about 1.6 as measured in a solvent of o-chlorophenol at a temperature of 25° C.

4. The flame retardant thermoplastic polyester resin composition of claim 1, wherein said melamine compound (C) comprises melamine, melamine cyanurate, melamine phosphate, melamine pyrophosphate, melamine polyphosphate or a combination thereof.

5. The flame retardant thermoplastic polyester resin composition of claim 1, wherein said inorganic metal compound (D) comprises aluminum hydroxide, magnesium hydroxide, calcium hydroxide, zinc sulfide, zinc oxide, titanium oxide, magnesium calcium carbonate, magnesium carbonate, calcium carbonate, zinc borate, zinc borate hydrate, magnesium sulfate hydrate or a combination thereof.

6. The flame retardant thermoplastic polyester resin composition of claim 1, wherein said fluorinated polyolefin resin (E) comprises polytetrafluoroethylene, polyvinylidenefluoride, tetrafluoroethylene/vinylidenefluoride copolymer, tetrafluoroethylene/hexafluoropropylene copolymer, ethylene/tetrafluoroethylene copolymer or a combination thereof.

7. The flame retardant thermoplastic polyester resin composition of claim 1, further comprising an additive selected from flame retardant aids, lubricants, release agents, nucleating agents, antistatic agents, stabilizers, reinforcing agents or a combination thereof.

8. The flame retardant thermoplastic polyester resin composition of claim 2, wherein said filler (F) comprises carbon fiber, glass fiber, glass beads, glass flake, carbon black, talc, clay, kaolin, mica, calcium carbonate, or a combination thereof.

9. A molded article prepared with the flame retardant thermoplastic polyester resin composition as defined in claim 1.

* * * * *

UNITED STATES PATENT AND TRADEMARK OFFICE
CERTIFICATE OF CORRECTION

| | | |
|---|---|---|
| PATENT NO. | : 7,851,532 B2 | Page 1 of 1 |
| APPLICATION NO. | : 12/476273 | |
| DATED | : December 14, 2010 | |
| INVENTOR(S) | : Pil Ho Kim, Jong Cheol Lim and In Sik Shim | |

It is certified that error appears in the above-identified patent and that said Letters Patent is hereby corrected as shown below:

On the Title Page insert Item (63):

-- (63)     Related U.S. Application Data

Continuation-in-part of application No. PCT/KR2007/006814, filed on Dec. 26, 2007. --

Signed and Sealed this
Eighth Day of March, 2011

David J. Kappos
*Director of the United States Patent and Trademark Office*